United States Patent [19]

Swiston, Sr.

[11] 4,410,883

[45] Oct. 18, 1983

[54] MULTIPLE ANNUNCIATION SYSTEM

[76] Inventor: Norman J. Swiston, Sr., 718 Delmar Rd., Glen Burnie, Md. 21061

[21] Appl. No.: 252,343

[22] Filed: Apr. 9, 1981

[51] Int. Cl.[3] .......................... G08B 1/08; H04M 11/04

[52] U.S. Cl. .................................... 340/538; 340/505; 340/518; 340/310 R; 340/310 CP

[58] Field of Search ............... 340/538, 505, 531, 518, 340/310 A, 310 R, 825.06, 825.07–825.13, 825.54, 825.55, 310 CP

[56] References Cited

U.S. PATENT DOCUMENTS

| | | | |
|---|---|---|---|
| 3,810,096 | 5/1974 | Kabat et al. | 340/310 CP |
| 3,964,047 | 6/1976 | Antonaccio | 340/310 A |
| 4,023,163 | 5/1977 | Krishnaiyer et al. | 340/534 |
| 4,109,246 | 8/1978 | Budrys et al. | 340/534 |

FOREIGN PATENT DOCUMENTS

| | | | |
|---|---|---|---|
| 2039402A | 8/1980 | United Kingdom | 340/538 |

*Primary Examiner*—Donnie L. Crosland
*Attorney, Agent, or Firm*—Murray & Whisenhunt

[57] ABSTRACT

A multiple annunciation system for a building, including a master unit and a plurality of remote units connected to the master unit by electric power wiring extending throughout the building. Each remote unit generates a characteristic code signal, and transmits this signal to the master unit over the power wiring. The master unit is programmed with a series of reference values corresponding to the individual remote units in the building, and the incoming code signals from the remote units are compared and checked against the corresponding reference values. Absence of an incoming code signal, due to an interruption in transmission of a remote unit, produces an alerting signal identifying the particular remote unit which has ceased to transmit.

15 Claims, 6 Drawing Figures

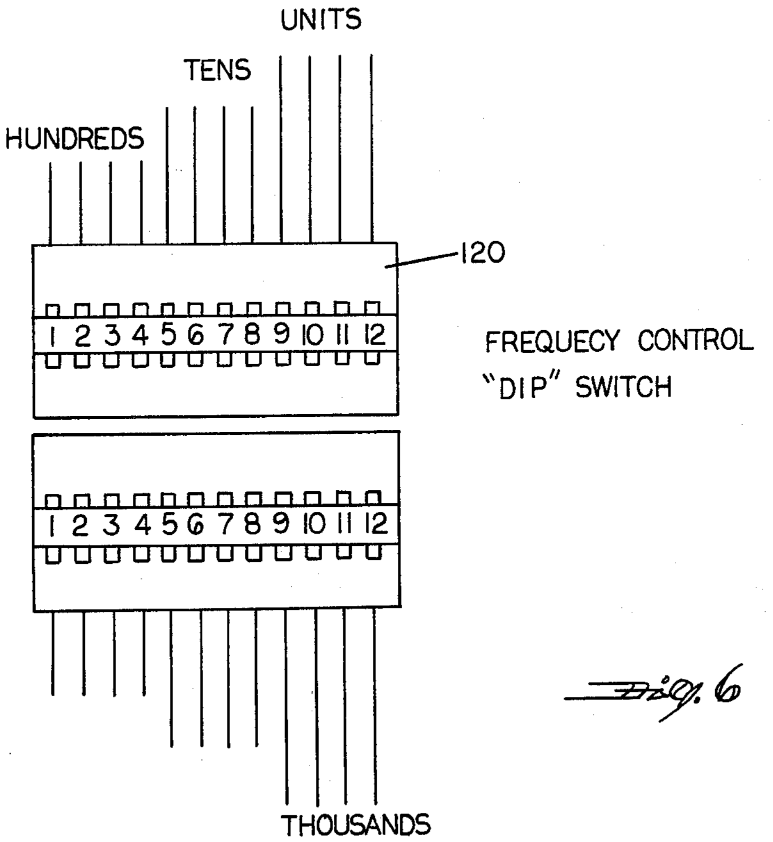
Fig. 6
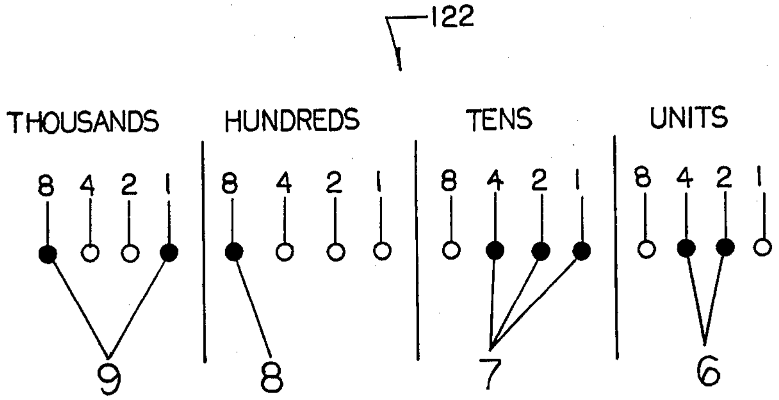

MULTIPLE ANNUNCIATION SYSTEM

This invention relates generally to communication systems which are used in buildings to facilitate communication between a master unit and a plurality of remote units located elsewhere in the building. More particularly, this invention relates to a communication system, in which the master unit continuously scans and evaluates the operational status of each remote unit, and determines the existence of any emergency or alerting condition at any particular remote unit.

BACKGROUND OF THE INVENTION

It is well known to utilize the conventional electric power wiring in a building for electrically connecting different units of intercommunication systems for electric transmission of conversations. A typical example of such a system can be found in many apartments and condominium complexes in which each room is provided with a remote unit from which it is possible to actuate a master unit door latch releasing mechanism to unlock the door to the complex. Such systems are also usually provided with an intercom arrangement and means for generating an audible signal so that a visitor can alert the resident of a selected apartment room, and such resident, upon hearing the signal, can communicate with the person operating the master unit, and, if desired, can activate the door latch releasing mechanism to permit the visitor to open the door and enter the apartment building. Such a system is described in U.S. Pat. No. 3,978,468 which issued on Aug. 31, 1976 to Bond et al. In the system described in the Bond et al patent, the master unit comprises a digital code selector which operates to generate a remote unit indentification code signal which is transmitted to the remote unit when the visitor calls the particular apartment room. Each remote unit includes a receiver for receiving the conversation transmission signal and the remote unit identification code signal, both of which are transmitted from the master unit to the remote unit over the electrical power wiring of the building.

SUMMARY OF THE INVENTION

According to one aspect of the invention, there is provided a communication system for a building, comprising a master unit and a plurality of remote units connected to the master unit by the electrical power wiring extending throughout the building, so that the master unit and the remote units can receive or transmit signals over the electric power wiring. Each of the remote units comprises a remote unit digital signal generating means for continuously generating a respective predetermined remote unit digital coded frequency signal having a respective digital coded signal frequency value. A remote unit signal transmitting means is connected to the electric power wiring for transmitting the respective remote unit digital coded frequency signals to the master unit over the electric power wiring. A remote unit digital coded frequency signal cut-off means, including an input signal receiving means, deactivates the digital signal generating means and thus interrupts transmission of the digital coded frequency signals upon receipt of an alerting input signal by the receiving means. The master unit comprises a signal interrogating means for interrogating and interpreting each of the remote unit digital coded frequency signals, to determine whether any interruption in transmission of one or more digital coded frequency signals has occurred. The master unit includes a digital coded frequency signal receiving means connected to the electric power wiring for receiving the digital coded frequency signals from each of the remote units. The signal interrogating means also includes a signal comparison means having a digital decoder for converting each of the digital coded frequency signal values into actual binary values in respect to each remote unit. A binary value scanning means is also provided for scanning each of the remote unit actual binary values and correlating these with respective remote unit reference binary values. When such correlation is not effected, i.e., when the scanning means does not detect an actual binary value for a particular remote unit, due to absence of a corresponding digital coded frequency signal, an alerting signal generating means connected to the master unit generates an alerting signal in respect of that remote unit, thereby indicating that an emergency or unusual situation exists with respect to that remote unit and that investigation is accordingly required.

In another aspect of the invention, the alerting signal in respect of a particular remote unit is generated not by interrupting a continuous transmission of a remote unit digital signal, but rather by arranging for the remote unit to be in a "stand-by" mode in which there is no continuous generation of a remote unit digital signal, and actuating the generation and transmission of such signal by introducing an input signal into the remote unit. Examples of such a stand-by (non-continuous) mode of operation are given below in connection with a medical alert module, watch tour service module, and the like.

While the invention of the present application has many applications, some of which will be described in more detail below, a primary area of application is in the annunciation of buildings with respect to smoke detection. In this particular application, each remote unit acts as a "listening" device, and continuously transmits a particular characteristic digital coded frequency signal over the power wiring which is detected by the master unit. When the smoke detector is activated due to smoke in the vicinity, the remote unit detects the tone emitted by the horn of the smoke detector, and this causes the remote unit to discontinue transmission of its characteristic digital coded frequency signal. The absence of this signal is detected by the master unit which immediately annunciates or indicates the existence of the emergency with reference to the particular remote unit involved. As a precaution against false alarms, the remote unit is generally designed so that a predetermined period of time must elapse from the onset of the smoke detector alarm before transmission of the characteristic digital coded signal of the smoke detector is discontinued. Generally, this period of time is no more than 60 seconds, more usually about three to seven seconds, for example about five seconds.

The system of the present invention gives rise to many significant advantages, which make it very attractive from commercial, constructional, energy conservation, and safety standpoints. In particular, the present system facilitates the continuous monitoring of a building, with information concerning specific locations being immediately available at a central point. As indicated above, a major application is in the area of smoke detector annunciation of buildings, whereby early detection of smoke at any location in the building is readily facilitated by the system of the invention. A further distinct advantage enjoyed by the present invention is that it can be readily installed using already existing electrical power wiring in a building. Thus, the invention has particular attraction not only for new construction work, but also for retrofit application, since it is unnecessary to replace present wiring or install new wiring systems. As a result of this, installation costs are substantially reduced over what they would be if a new wiring system had to be installed. A yet further advantage of the present invention is that it can be used to detect and control heating and air conditioner units in the building, which enables significant reductions in energy consumption to be achieved as well as cuts in associated utility costs.

BRIEF DESCRIPTION OF THE DRAWINGS

The advantages of the present invention will become more fully apparent from the following detailed description when read in conjunction with the accompanying drawings, in which

FIG. 6 shows a typical frequency arrangement of a remote unit.

DETAILED DESCRIPTION OF THE INVENTION

Figure 1:
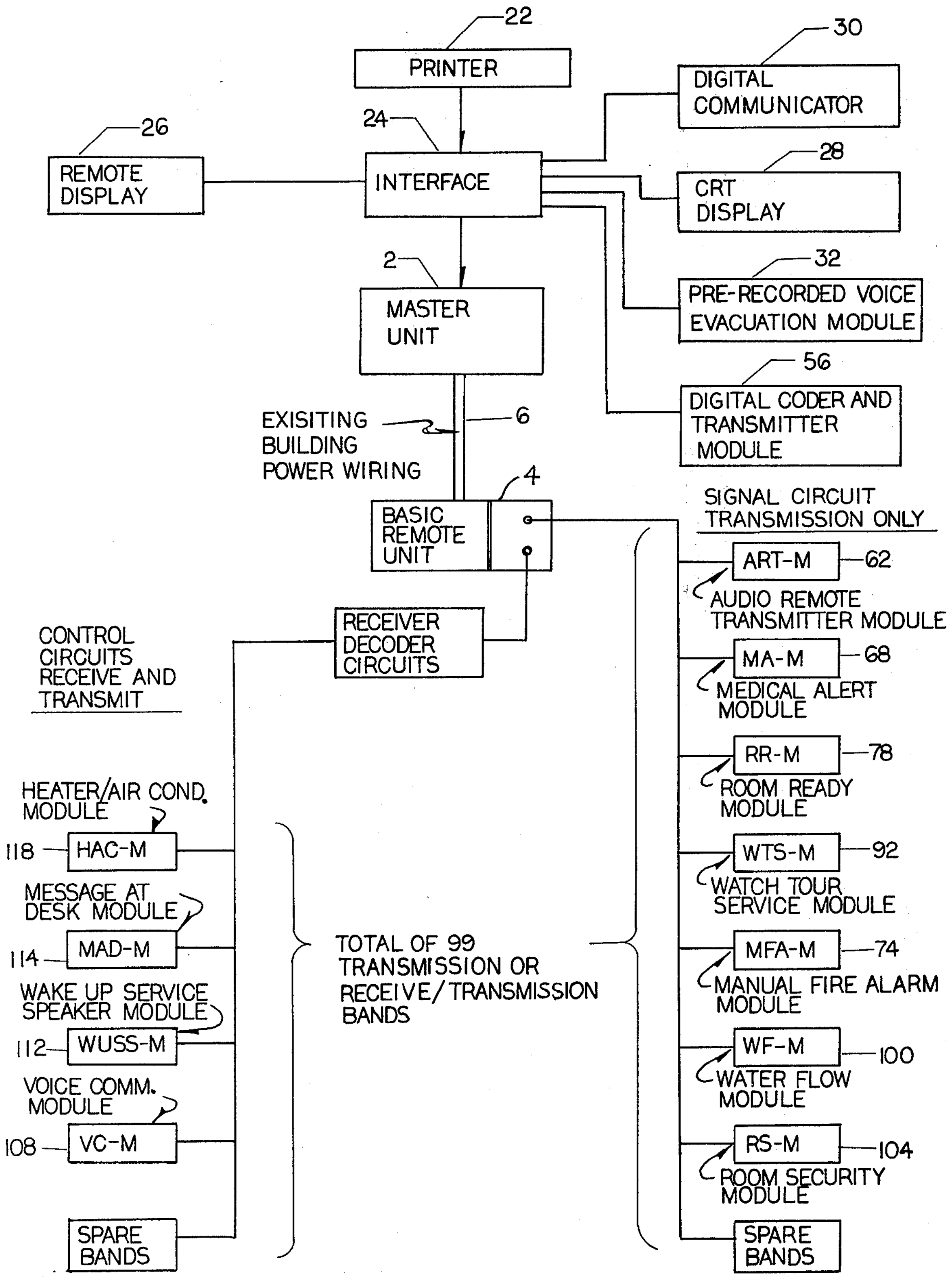
FIG. 1 is a block diagram of the communication system of the invention.

In the FIGS. 1–5, the main circuit components of the master unit, and its associated components shown in FIG. 1, as well as the circuit components of the remote units and possible associated modules, are shown in block diagram form since these components and the associated circuitry are conventional. Many of the components and much of the circuitry described in U.S. Pat. No. 3,978,468 are the same as that in the present communication system, and accordingly the disclosure of U.S. Pat. No. 3,978,468 is incorporated by reference in its entirety in the present application.

Referring to FIG. 1, there is shown, in block diagram form, a master control 2 connected to a remote unit 4 by the existing electrical power wiring 6 in the building. Associated with the master unit 2 is a series of components which are primarily intended to facilitate communication and display of information received by the master unit from the individual remote units 4. These components will be described in more detail below. FIG. 1 also shows a series of optional module components connected to the remote unit 4, and these are shown in more detail in FIGS. 4 and 5. Again, these units and their mode of operation will be discussed in more detail below.

Figure 2:
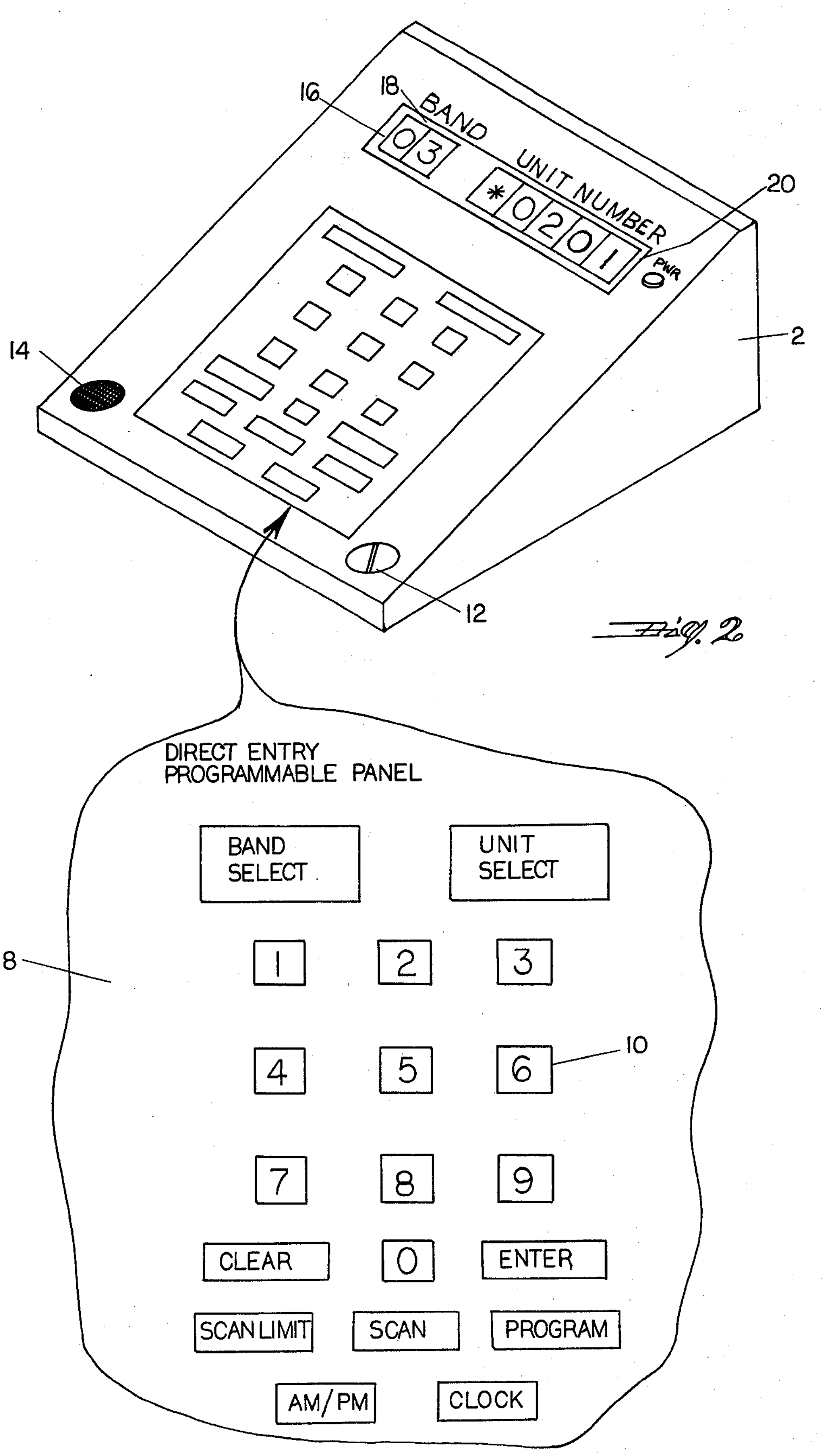
FIG. 2 is a perspective view of the master unit, with an enlarged view of the control panel.

The master unit 2 is usually designed as a desk top component, and is illustrated in such a form in FIG. 2. In this particular form, the master unit 1 has an exposed direct entry programmable panel 8 which permits an operator to make inquiries of any particular remote unit by entry of an appropriate numerical code by pressing the numbered buttons 10. The master unit is provided with an on/off switch 12, and has means 14 for generating an audible alarm signal. A display unit 16 indicates the number of bands 18 (i.e., the number of transmission or receiving-transmission circuits that the master unit 2 is programmed to scan), and the display unit 16 also includes a unit number indicator 20 (for example, the room number for an hotel or apartment or condominium complex), which unit number indicator is activated when an alarm is received from the remote unit 4 in that particular room. In FIG. 2, the particular unit number displayed is 0201, indicating that room 201 is involved, and the band number displayed is 03 indicating the particular transmission or receiving-transmission circuit over which the information has been transmitted. As an optional feature, it is possible to provide a printer 22 which would set forth the results of remote unit interrogation at any particular time of the day or night.

Figure 3:
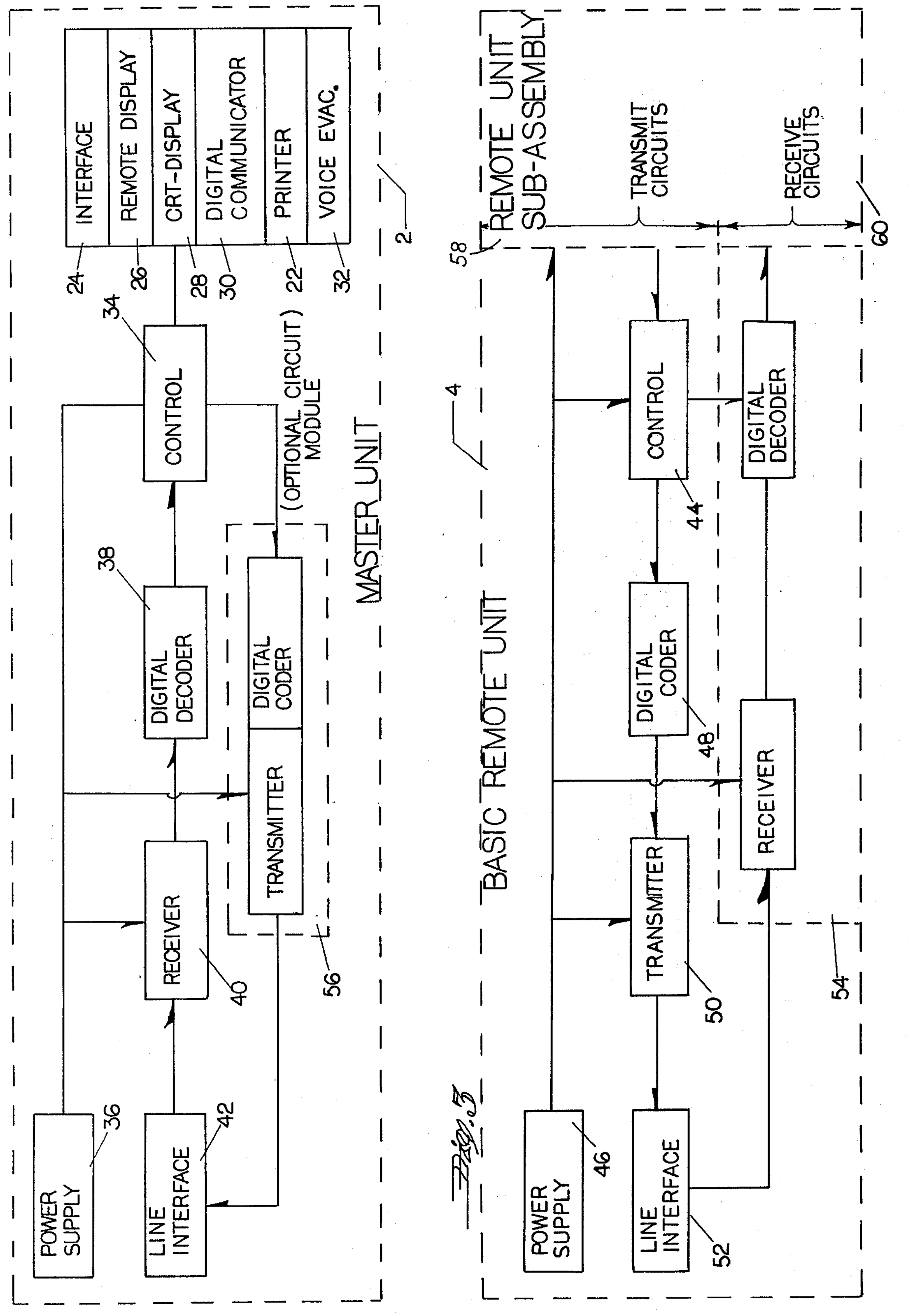
FIG. 3 is a block circuit diagram of the master unit and a remote unit.

Turning to FIG. 3, it will be seen that the master unit 2 comprises an interface module 24 which facilitates connection of the master unit to any desired external device, such as a remote display 26, a cathode ray tube (CRT) display 28, a digital communicator 30, a printer 22, or a voice evacuation communication system 32, which may be pre-recorded in numerous languages to ensure everybody understands the existence of an emergency situation and the need for evacuation of the building. The components 22 and 26 through 32 are optional, and any combination of these components may be utilized as dictated by particular building requirements. The possible arrangement of components 22 and 26 through 32 in relation to the master unit is illustrated in FIG. 1.

As shown in FIG. 3, the master unit comprises a control unit 34 which is powered by a self-contained power supply 36. This power supply can itself be powered using the electrical power wiring of the building, and thus no additional power source is required. The control unit 34 is connected to a digital de-coder 38 which receives digital frequency signals from the receiver 40. Receiver 40 is connected to the electrical power wiring of the building through a line interface 42.

Referring to the remote unit 4 as shown in FIG. 3, units 44 and 48 produce a characteristic digital code frequency signal which is transmitted over the electrical power wiring to the receiver 40 of the master unit 2. This signal is then de-coded by the digital de-coder 38 into actual binary values, typically using a 16 bit microprocessor (see later in connection with FIG. 6). The actual binary values produced by the digital de-coder 38 are scanned by the control unit 34 and compared to a series of reference binary values with which the control unit 34 has been programmed corresponding to respective remote units. Absence of a binary value for a particular remote unit causes the alarm 14 to sound indicating that an emergency condition exists with respect to the particular remote unit.

Referring, again, to the remote unit 4, as illustrated in FIG. 3, a control circuit 44 is provided which is powered by a self-contained power supply 46. Power supply 46 is essentially the same as power supply 36 described above in connection with the master unit 2. The control circuit 44 is programmed with a characteristic code, and this is converted into a digital coded frequency signal by digital coder 48. The frequency signal can have a frequency in either the AM or FM range, with frequencies in the range of 30 hertz to 500 megahertz being possible. Generally, frequencies in the range of 250 hertz to 900 kilohertz are utilized, with frequencies in the range of 50 kilohertz to 150 kilohertz being particularly preferred. One disadvantage of utilizing FM frequencies is that the components required for generating such a frequency are quite expensive. On the other hand, frequencies in the AM range can be generated without the use of such expensive equipment, and accordingly, AM frequencies in the range of 75 kilohertz to 125 kilohertz are usually employed. The characteristic digital coded signal generated by the digital coder 48 is impressed on transmitter 50 for transmission to the master unit 2 through line interface 52. Again, in view of the fact that transmitter 50 is connected to the master unit through the electric power wiring in the building, no additional installation of wiring is necessary to achieve electrical connection between each remote unit 4 and the master unit 2.

A particular advantage of each remote unit 4 is that each can be programmed to transmit a particular frequency to the master unit 2, thus providing a simple and effective way of distinguishing between each and every remote unit, no matter how many there are and no matter where they are located, in any particular building.

As an optional possibility, remote unit 4 may be provided with a receiver circuit module 54, and the master unit 2 may be provided with a transmission circuit module 56. The circuit 54 may be utilized to monitor a particular location and transmit signals to the master unit that, for example, an air conditioner or heating unit has been left running. The transmission circuit module 56 can, in turn, be utilized to control the on/off function of a remote circuit such as, for example, that of the air conditioner and heating unit mentioned above, thus, enabling a signal to be dispatched from the master unit to switch the units off. From this, it will be apparent that the communication system of the present invention enjoys a yet further advantage of facilitating energy conservation by detecting and controlling energy consuming units situated around the building.

Figure 4:
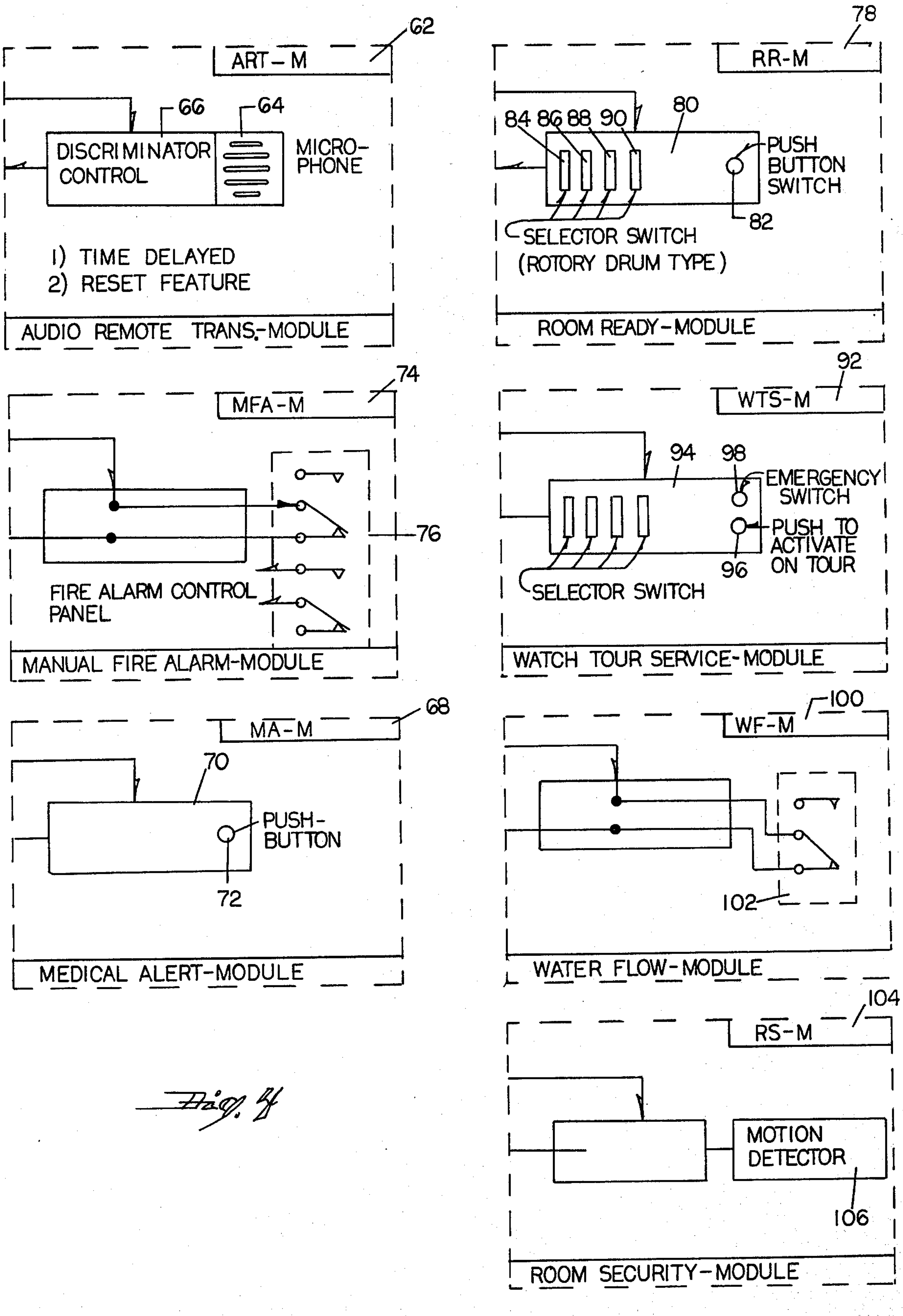
FIGS. 4 and 5 show a series of remote unit sub-assemblies.
Figure 5:
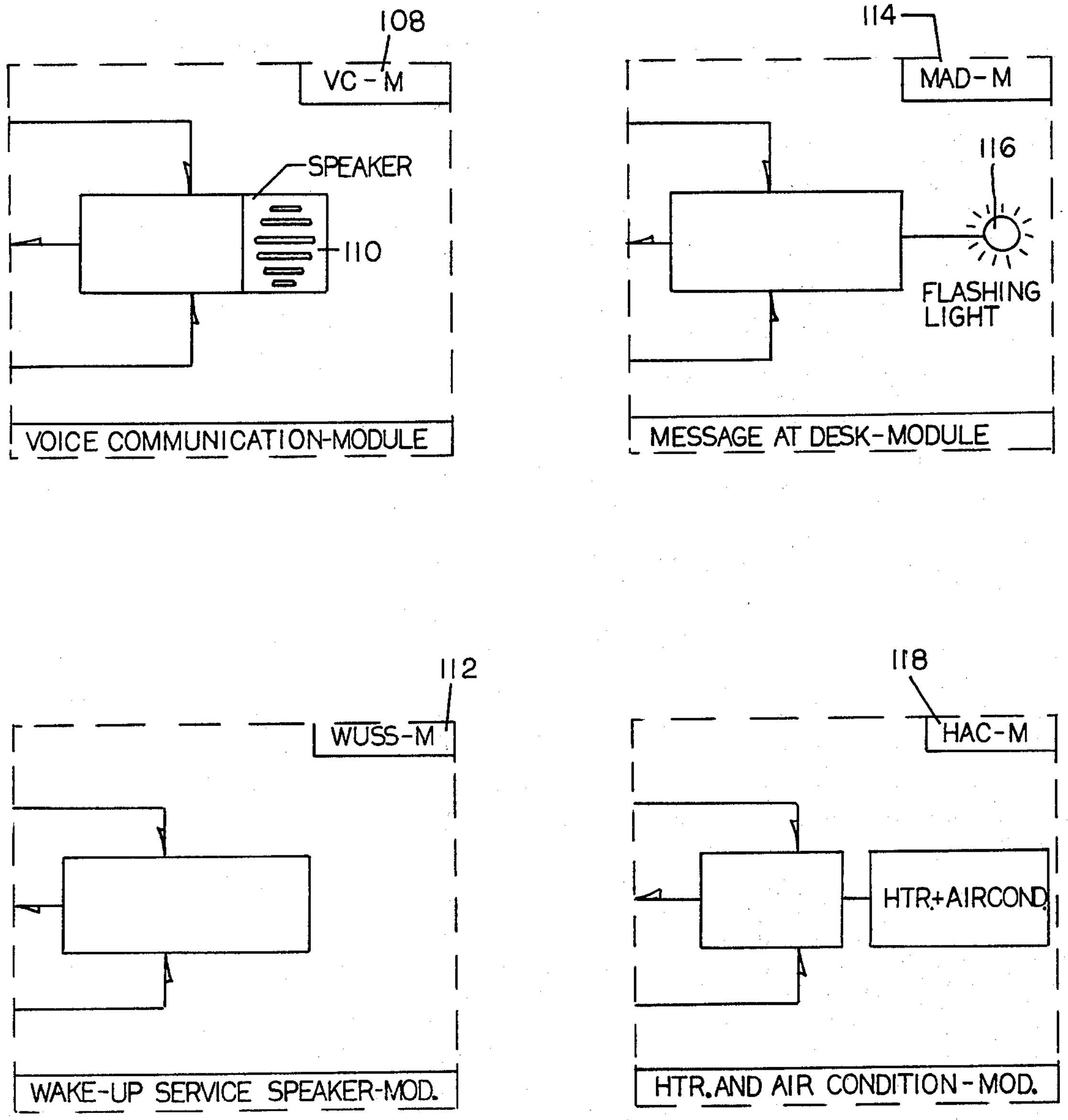

FIGS. 4 and 5 illustrate several possible remote sub-assemblies which may be connected to the remote unit 4. The sub-assemblies illustrated in FIG. 4 are transmission circuits, and are placed in the remote unit 4 at the location indicated generally as 58. The sub-assemblies illustrated in FIG. 5, on the other hand, are examples of circuits which can both receive and transmit signals, and these are situated in remote unit 4 at the location generally indicated as 60. It is to be emphasized that the examples of circuits illustrated in FIG. 4 and 5 are not exhaustive, and are given by way of example to illustrate the broad applicability and flexibility of the communication system of the invention.

Referring to FIG. 4, sub-assembly 62 is an audio remote transmission module (ART-M) which includes a listening-type device 64, suitably a microphone. This module is primarily designed to operate as a cut-off means to deactuate the signal generating means 44 upon detection by module 62 of a signal which is audible to the device 64. By way of example, when the remote transmmission module is used as part of a smoke annunciation system, the remote unit is designed so that deactuation of the signal generating means 44 occurs when an audible frequency signal is detected by listening-type device 64. As a guard against false alarms, the audio remote transmission module 62 incorporates a time delay feature in discriminator control unit 66 which prevents deactuation until a period of time has elapsed from the onset of the activating audible frequency signal. While any particular time delay can be incorporated, it is generally preferred that a time delay of between 5 and 10 seconds is used so as to avoid the occurrence of false alarms due to inadvertent smoke detector activation which is subsequently stopped after the lapse of about 2 or 3 seconds, or due to other similar sounds of short duration, e.g., sounds generated by a siren of a passing police car or ambulance. It will be appreciated that, with an audio remote transmission module, the remote unit 4 is operated so that there is a continuous generation of digital coded signals, which continuous generation is deactuated or interrupted only upon receipt by the audio remote transmission module of audio frequency signals falling within a predetermined frequency range.

Sub-assembly 68 (FIG. 4) is a medical alert module (MA-M). This type of module is primarily designed for installation in hospitals and other medical centers where the need for urgent medical assistance may arise. While it is possible for the remote unit incorporating this module to operate in a continuous mode, i.e., continuously transmit a characteristic digital coded signal, it is preferred to utilize a stand-by (pulsed) mode in which it is not continuously transmitting a characteristic digital code signal but rather transmits such a signal upon actuation of switch 70 by pressing button 72.

Sub-assembly 74 (FIG. 4) is a manual fire alarm module (MFA-M) which can be readily connected to any existing fire alarm station. While any conventional firm alarm switching device can be employed for this type of module, it is generally preferred to employ a unit containing a double pole-double throw switch 76. As with the audio remote transmission module (ART-M) 62 discussed above, it is preferred to operate the manual fire alarm module (MFA-M) in a continuous mode so that any fire emergency is immediately transmitted to the master unit 2.

Sub-assembly 78 (FIG. 4) is a room ready module (RR-M) which is primarily intended for use by cleaning personnel in hotels, office blocks, and the like. This type of module is an example of a mobile-type module which is carried by a cleaning person who is getting rooms ready for newly arriving occupants. When the room is ready, the cleaning person simply plugs the mobile module into any nearby conventional 110 v A.C. outlet and actuates switch 80 by depressing button 82 which transmits a characteristic digital coded signal to the master unit 2. It will be noted that the switch 80 is a selector-type switch (e.g., a rotary drum type switch), which facilitates selection of a particular code by rotation of drums 84, 86, 88, and 90 so that the room from which the signal is being transmitted can be readily identified.

Sub-assembly 92 (FIG. 4) is a watch tour service module (WTS-M), and is another example of a mobile-type module. In this particular instance, the module is used by a guard of, for example, a large factory or warehouse, and enables the guard to send a signal to the main security office which houses a master unit 2 advising of his location and of any possible security problems. The module is provided with a selector type switch 94 which may be of a rotary drum type similar to that described in connection with the room ready module 78. The switch is also provided with an actuating button 96, and is also provided with an emergency switch 98 which generates a particular type of signal indicating the presence of an emergency security situation. It is preferred to operate this type of module in a non-continuous (pulsed) mode, since the module is being carried by a person and is not continuously plugged in to the electrical power wiring of the building.

Sub-assembly 100 (FIG. 4) is a water flow module (WF-M) for monitoring water flow in a conduit system or the like. This module includes a switch 102 which can be actuated to sense the water flow in the event of any emergency. It is preferred to operate this module in a continuous mode so that any problems can be immediately detected and transmitted to the master unit 2.

Sub-assembly 104 (FIG. 4) is a room security module (RS-M) and is designed to be connected to any type of security system having a dry set of contacts that open after the security detector is energized. This module contains a motion detector 106 which, upon actuation by the security detector, enables the module to transmit a characteristic digital code signal to the master unit 2. It is preferred to operate this module in a continuous mode so that emergencies can be immediately detected and conveyed to the master unit 2, although either mode of operation (continuous or non-continuous) is possible.

FIG. 5 illustrates several examples of remote unit sub-assemblies which are designed not only to transmit characteristic digital coded signals, but also to receive signals from the master unit 2 over the electrical power wiring in the building. These sub-assembly modules are connected to the remote unit 4 at the location indicated at 60. The sub-assemblies illustrated in FIG. 5 are not exhaustive, and many circuit modules can be designed according to the particular requirement of a user.

Sub-assembly 108 (FIG. 5) is a voice communication module (VC-M) including a speaker 110, and can be used for transmitting voice communication between individual rooms and the master unit 2.

Sub-assembly 112 (FIG. 5) is a wake-up service speaker module (WUSS-M), and can be used to wake-up guests at any predetermined time.

Sub-assembly 114 (FIG. 5) is a message-at-desk module (MAD-M), and preferably comprises a light 116 which can be actuated to flash when a message for the occupant of the room has been received at the central desk where the master unit 2 is situated.

Sub-assembly 118 (FIG. 5) is a heater/air conditioner module (HAC-M), and can be used to transmit a signal to the master unit that a heater or air conditioner has been left on if the room is not occupied. This type of module is, therefore, significant not only from a safety viewpoint, but also permits savings in energy consumption.

FIG. 6 illustrates a typical frequency arrangement of a remote unit 4. As discussed above, when a characteristic digital coded signal from a particular remote unit 4 is received by receiver 40 of the master unit 2, it is decoded by digital de-coder 38 into an actual binary value corresponding to the particular remote unit involved. The characteristic digital coded signal of the remote unit 4 can be generated by any suitable digital signal generating means, but it is preferred to employ a conventional frequency control "dip" switch, which is shown schematically as 120 in FIG. 6. The scheme shown at 122 illustrates how the number 9876 is arrived at using a 4 bit word system, i.e., one word comprising the bits 1, 2, 4, and 8. The scheme 122 is that utilized in a 16 bit word processor, and it is preferred to use such a processor in the present invention. Such microprocessors are entirely conventional in the art, and accordingly further discussion of their mode of operation is believed unnecessary.

The description of the present invention set forth above has centered primarily on the continuous mode of use wherein each remote unit 4 transmits a characteristic digital coded signal over the electric power wiring in the building to the master unit 2 which is arranged to scan continuously the incoming signals from the remote units 4. However, it is also possible to operate the invention in a non-continuous mode where each remote unit 4 is in a stand-by mode. In this mode, the remote unit is connected to the electrical power wiring via a conventional 110 volt A.C. outlet but is not continuously transmitting a characteristic digital code signal. Such a signal is transmitted upon actuation of the remote unit 4, and examples of such a non-continuous (pulsed) mode are described above in connection with the medical alert module 68, voice communication module 108, wake-up service speaker module 112, and message at desk module 114. A yet further mode of operation of the communication system of this invention is the mobile mode in which the remote unit 4 is carried by a person and plugged into the electrical power wiring of the building when it is desired to transmit a signal to the master unit 2. Examples of such a mobile mode of operation are described above in connection with the room ready module 78 and the watch tour service module 92. A yet further aspect of the present invention resides in the fact that each remote unit 4 can be operated in a "pulsed" mode, in which a characteristic digital coded frequency signal is periodically generated upon receipt by the remote unit of an alerting input signal. Thus, in this particular mode of operation, the remote unit is initially in a "stand-by" mode, and actuation by the incoming signal results in the generation of the digital frequency signal which is detected by the master unit 2. In an alternative approach, it is possible for the remote unit 4 to be designed such that it includes a pulse signal generator which generates a pulsed digital coded frequency signal which is preferably a regular periodic pulse signal, although an irregular periodic pulsed frequency signal could be generated if desired, with appropriate modifications in the detection equipment of the master unit 2. In this mode of operation, where a regular pulse frequency signal is generated by the remote unit 4, receipt by the remote unit of an alerting input signal would result in deactuation of the pulse generator thus interrupting transmission of the pulsed frequency signal to the master unit 2. The master unit would be programmed to detect an interruption in the transmission of the pulsed frequency signals upon the lapse of a period of time greater than the lapse of time between each pulsed frequency signal.

I claim:

1. In a communication system for a building including a master unit and a plurality of remote units connected to said master unit by electrical power wiring extending throughout the building, said master unit and said plurality of remote units each being connected to receive or transmit signals over said electrical power wiring, the improvement comprising each of said remote units comprising a remote unit digital signal generating means for generating a respective predetermined remote unit digital coded frequency signal having a digital coded frequency signal value, remote unit signal transmitting means connected to said electrical power wiring for transmitting said respective remote unit digital coded frequency signal to said master unit over said electrical power wiring, a remote unit digital coded frequency signal cut off means including an input signal receiving means for deactuating said digital signal generating means and interrupting transmission of said digital coded frequency signal upon receipt of an alerting input signal by said input signal receiving means, said master unit comprising a signal interrogating means for interrogating and interpreting each of said remote unit digital coded frequency signals, to determine whether any interruption in transmission of one or more digital coded frequency signals has occurred, said signal interrogating means including:

a digital coded frequency signal receiving means connected to said electrical power wiring for receiving said digital coded frequency signals from each of said remote units, a digital decoder means for converting each of said digital coded frequency signal values into respective remote unit actual binary values, signal comparator means for scanning each of said remote unit actual binary values and correlating same with respective remote unit reference binary values, and alerting signal generating means for generating an alerting signal in respect of a remote unit when a reference binary value for said remote unit is not correlated with an actual binary value for said remote unit.

2. A communication system according to claim 1, wherein said cut off means includes a listening device which actuates said cut off means upon detection by said listening device of an audible frequency signal.

3. A communication system according to claim 1 or 2, wherein said listening device includes means for delaying actuation of said cut off means for a predetermined period of time upon detection by said listening device of said audible frequency signals.

4. A communication system according to claim 1, wherein each of said remote units and said master unit operate in a continuous mode, in which each remote unit continuously transmits a characteristic digital coded frequency signal which is converted into a respective remote unit actual binary value, and said master unit continuously interrogates each of said actual binary values and compares same with reference binary values for each of said remote units.

5. In a communication system for a building, including a master unit and a plurality of remote units connected to said master unit by electrical power wiring extending throughout the building, said master unit and said plurality of remote units each being connected to receive or transmit signals over said electrical power wiring, the improvement comprising each of said remote units comprising an audio remote transmission unit including an audio remote transmission unit digital signal generating means for continuously generating a respective predetermined audio remote transmission digital coded frequency signal having a digital coded frequency signal value, an audio remote transmission unit input signal receiver for receiving an input audio frequency signal, an audio remote transmission unit digital coded frequency signal cut off means connected to said input signal receiver for deactuating said digital signal generating means and interrupting transmission of said digital coded frequency signal upon receipt of an input audio frequency signal by said input signal receiver, audio remote transmission unit signal transmitting means connected to said electrical power wiring for transmitting said respective audio remote transmission unit digital coded frequency signal to said master unit over said electrical power wiring, said master unit comprising a signal interrogating means for interrogating and interpretating each of said audio remote transmission unit digital coded frequency signals, to determine whether any interruption in transmission of one or more of said digital coded frequency signals has occurred, said signal interrogating means including:

a digital coded frequency signal receiving means connected to said electrical power wiring for receiving said audio remote transmission unit digital coded frequency signals from each of said remote transmission units, a digital decoder means for converting each of said audio remote transmission unit digital coded frequency signal values into respective audio remote transmission unit actual binary values, signal comparator means for scanning each of said audio remote transmission unit actual binary values and correlating same with respective audio remote transmission unit reference binary values, and alerting signal generating means connected to said master unit for generating an alerting signal in respect of an audio remote transmission unit when a reference binary value for said audio remote transmission unit is not correlated with an actual binary value for said audio remote transmission unit, indicating an interruption in transmission of a respective digital coded frequency signal value from said audio remote transmission unit.

6. A communication system according to claim 5, wherein said cut off means is actuated by receipt of audible frequency signals.

7. A communication system according to claim 5, wherein said cut off means is actuated upon receipt by said input signal receiver of an audible alarm tone emitted by a commercially available smoke detector.

8. In a communication system for a building, including a master unit and a plurality of remote units connected to said master unit by electrical power wiring extending through the building, said master unit and said plurality of remote units each being connected to receive or transmit signals over said electrical power wiring, the improvement comprising each of said remote units comprising a remote unit digital signal generating means for generating a respective predetermined remote unit digital coded frequency signal having a digital coded frequency signal value, remote unit actuating means connected to said remote unit for actuating said digital signal generating means to generate a said remote unit digital coded frequency signal upon receipt of an alerting signal by said remote unit actuating means, remote unit signal transmitting means connected to said electrical power wiring for transmitting said respective remote unit digital coded frequency signals to said master unit over said electrical power wiring, said master unit comprising a signal interrogating means for interrogating and interpreting each of said remote unit digital coded frequency signals when transmitted to said master unit, said signal interrogating means including:

a digital coded frequency signal receiving means connected to said electrical power wiring for receiving a said digital coded frequency signal from a remote unit which has been actuated, a digital decoder means for converting each of said digital coded frequency signal values into respective remote unit actual binary values, signal comparator means for scanning each of said remote unit actual binary values and correlating same with respective remote unit reference binary values, and alerting signal generating means for generating an alerting signal in respect of a remote unit when a reference binary value for said remote unit is correlated with an actual binary value for said remote unit.

9. A communcation system according to claim 8, wherein said remote unit is a mobile unit which is connectable to said electrical power wiring extending throughout the building when it is desired to transmit a characteristic digital signal to said master unit.

10. In a communication system for a building including a master unit and a plurality of remote units connected to said master unit by electrical power wiring extending throughout the building, said master unit and said plurality of remote units each being connected to receive or transmit signals over said electrical power wiring, the improvement comprising each of said remote units comprising a remote unit pulsed digital signal generating means for generating a predetermined remote unit pulsed digital coded frequency signal having a pulsed digital coded frequency value, remote unit signal transmitting means connected to said electrical power wiring for transmitting said remote unit pulsed digital coded frequency signal to said master unit over said electrical power wiring, a remote unit digital coded frequency signal cut off means including an input signal receiving means for deactivating said digital signal generating means and interrupting transmission of said pulsed digital coded frequency signals upon receipt of an alerting input signal by said input signal receiving means, said master unit comprising a signal interrogating means for interrogating and interpreting each of said remote unit pulsed digital coded frequency signals, to determine whether any interruption in transmission of one or more pulsed digital coded frequency signals has occurred, said signal interrogating means including:

a pulsed digital coded frequency signal receiving means connected to said electrical power wiring for receiving said pulsed digital coded frequency signals from each of said remote units, a digital decoder means for converting each of said pulsed digital coded frequency signal values into respective remote unit actual binary values, signal comparator means for scanning each of said remote unit actual binary values and correlating same with respect to remote unit reference binary values, and alerting signal generating means for generating an alerting signal in respect of a remote unit when a reference binary value for said remote unit is not correlated with an actual binary value for said remote unit after elapse of a predetermined period of time which is greater than the time period separating each of said pulsed digital coded frequency signals.

11. A communication system acccording to claim 10, wherein said remote unit pulsed digital signal generating means generates a regular periodic pulsed digital frequency signal.

12. In a communication system for a building including a master unit and a plurality of remote units connected to said master unit by electrical power wiring extending throughout the building, said master unit and said plurality of said remote units each being connected to receive or transmit signals over said electrical power wiring, the improvement comprising each of said remote units comprising a remote unit pulsed digital signal generating means for generating a predetermined remote unit pulsed digital coded frequency signal having a pulsed digital coded frequency signal value, remote unit signal transmitting means connected to said electrical power wiring for transmitting said remote unit pulsed digital coded frequency signal to said master unit over said electrical power wiring, said remote unit pulsed digital signal generating means being actuated upon receipt of an alerting input signal, said master unit comprising a signal interrogating means for interrogating and interpreting each of said remote unit pulsed digital coded frequency signals when transmitted by one or more of said remote units to determine whether one or more of said units has been actuated by receipt of an alerting input signal, said signal interrogating means including:

a digital coded frequency signal receiving means connected to said electrical power wiring for receiving a pulsed digital coded frequency signal from one or more of said remote units;

a digital decoder means for converting each of said pulsed digital coded frequency signal values into respective remote unit actual binary values;

signal comparator means for scanning each of said remote unit actual binary values and correlating same with respect to remote unit reference binary values; and alerting signal generating means for generating an alerting signal in respect of a remote unit when a reference binary value for said remote unit is correlated with an actual binary value for said remote unit, indicating that a pulsed digital coded frequency signal has been transmitted by said remote unit.

13. A communication system acccording to claim 12, wherein said pulsed digital coded frequency signal is a regular periodic pulsed digital coded frequency signal.

14. A communication system according to claim 12, wherein said pulsed digital coded frequency signal is an irregular pulsed digital coded frequency signal.

15. In a communication system for a building including a master unit and a plurality of remote units connected to said master unit by electrical power wiring extending throughout the building, said master units and said remote units each being connected to receive or transmit signals over said electrical power wiring, the improvement comprising each of said remote units comprising a remote unit digital signal generating means for generating a respective predetermined remote unit digital coded frequency signal having a digital coded frequency signal value upon receipt of an alerting signal by said remote unit, said remote unit including a listening device for actuating said remote unit digital signal generating means upon receipt by said listening device of an audible alerting input signal from an alerting source, remote unit signal transmitting means connected to said electrical power wiring for transmitting said respective remote unit digital coded frequency signal to said master unit over said electrical power wiring, said master unit comprising a signal interrogating means for interrogating and interpreting each of said remote unit digital coded frequency signals transmitted to said master unit, said signal interrogating means including:

a digital coded frequency signal receiving means connected to said electrical power wiring for receiving said digital coded frequency signal from a remote unit which has been actuated, a digital decoder means for converting each of said digital coded frequency signal values into respective remote unit actual binary values, signal comparator means for scanning each of said remote unit actual binary values and correlating same with respect to remote unit reference binary values, and alerting signal generating means for generating an alerting signal in respect of a remote unit when a reference binary value for said remote unit is correlated with an actual binary value for said remote unit.

* * * * *